(12) United States Patent
Lee et al.

(10) Patent No.: US 7,562,752 B2
(45) Date of Patent: Jul. 21, 2009

(54) RETRACTABLE CABLE DEVICE

(75) Inventors: Che-Ming Lee, Shenzhen (CN);
Chen-Chi Fan, Shenzhen (CN);
Chih-Chiang Wu, Shenzhen (CN);
Wei-Hsi Chen, Shenzhen (CN)

(73) Assignee: Hon Hai Precision Industry Co., Ltd.,
Tu-Cheng, Taipei Hsien (TW)

( * ) Notice: Subject to any disclaimer, the term of this patent is extended or adjusted under 35 U.S.C. 154(b) by 486 days.

(21) Appl. No.: 11/308,633

(22) Filed: Apr. 14, 2006

(65) Prior Publication Data

US 2007/0040753 A1    Feb. 22, 2007

(30) Foreign Application Priority Data

Aug. 19, 2005    (CN) .................. 2005 1 0036751.X (51) Int. Cl.
*H01Q 1/00*  (2006.01)
*G09G 5/00*  (2006.01)
(52) U.S. Cl. ................. 191/12.2 R; 343/900; 343/877
(58) Field of Classification Search .............. 343/900, 343/715, 901, 903, 877; 191/12.2 R, 12 R, 191/12.4, 12.2 A
See application file for complete search history.

(56) References Cited

U.S. PATENT DOCUMENTS

| 4,190,839 | A  |   | 2/1980  | Liautaud |
| 6,230,860 | B1 | * | 5/2001  | Wu ..................... 191/12.2 R |
| 6,658,130 | B2 | * | 12/2003 | Huang ...................... 381/384 |
| 6,942,079 | B2 | * | 9/2005  | Chang ...................... 191/12.4 |

FOREIGN PATENT DOCUMENTS

| CN | 2406977 Y | 11/2000 |
| CN | 2435862 Y | 6/2001  |

* cited by examiner

*Primary Examiner*—Mark T Le
(74) *Attorney, Agent, or Firm*—Frank R. Niranjan (57) ABSTRACT

The retractable cable device includes a base, a rotary portion, a spring, a cover, and at least two medal plates. The rotary portion cooperates with the base to form a cavity, and the cable is disposed on the rotary portion. The spring is disposed in the cavity for driving the rotary portion to rotate. The cover is coupled to the base. The metal plate is connected to the rotary portion for maintaining an electrical connection between the antenna and the cable when the rotary portion rotates.

18 Claims, 7 Drawing Sheets

FIG. 7

RETRACTABLE CABLE DEVICE

FIELD OF THE INVENTION

The invention relates to a retractable cable device, and particularly to a retractable cable device for a wireless communication device.

DESCRIPTION OF RELATED ART

Nowadays, wireless communication devices are widely used, and an antenna is an indispensable part of the wireless communication device. Many wireless communication devices, such as wireless access points employ several external antennas for polarization. Typically, when the wireless communication device is in an environment where surrounding impediments directly affect signal reception, a user may choose to dispose an antenna apart from the wireless communication device. At this point, a cable with a length of several meters is needed which is usually found in a space within the device. However, when the user finishes using the wireless communication device, it is difficult for him/her to return the cable to its space. Moreover, the cable is prone to becoming entangled with other things.

SUMMARY OF INVENTION

A retractable cable device for retracting a cable connected to an antenna is provided. The retractable cable device includes a base, a rotary portion, a spring, a cover, and at least two metal plates. The rotary portion cooperates with the base to form a cavity, and the cable is disposed on the rotary portion. The spring is disposed in the cavity for driving the rotary portion to rotate. The cover is coupled to the base. The metal plates are connected to the rotary portion for maintaining an electrical connection between the antenna and the cable when the rotary portion rotates.

Other advantages and novel features will become more apparent from the following detailed description when taken in conjunction with the accompanying drawings, in which:

DETAILED DESCRIPTION

Figure 1:
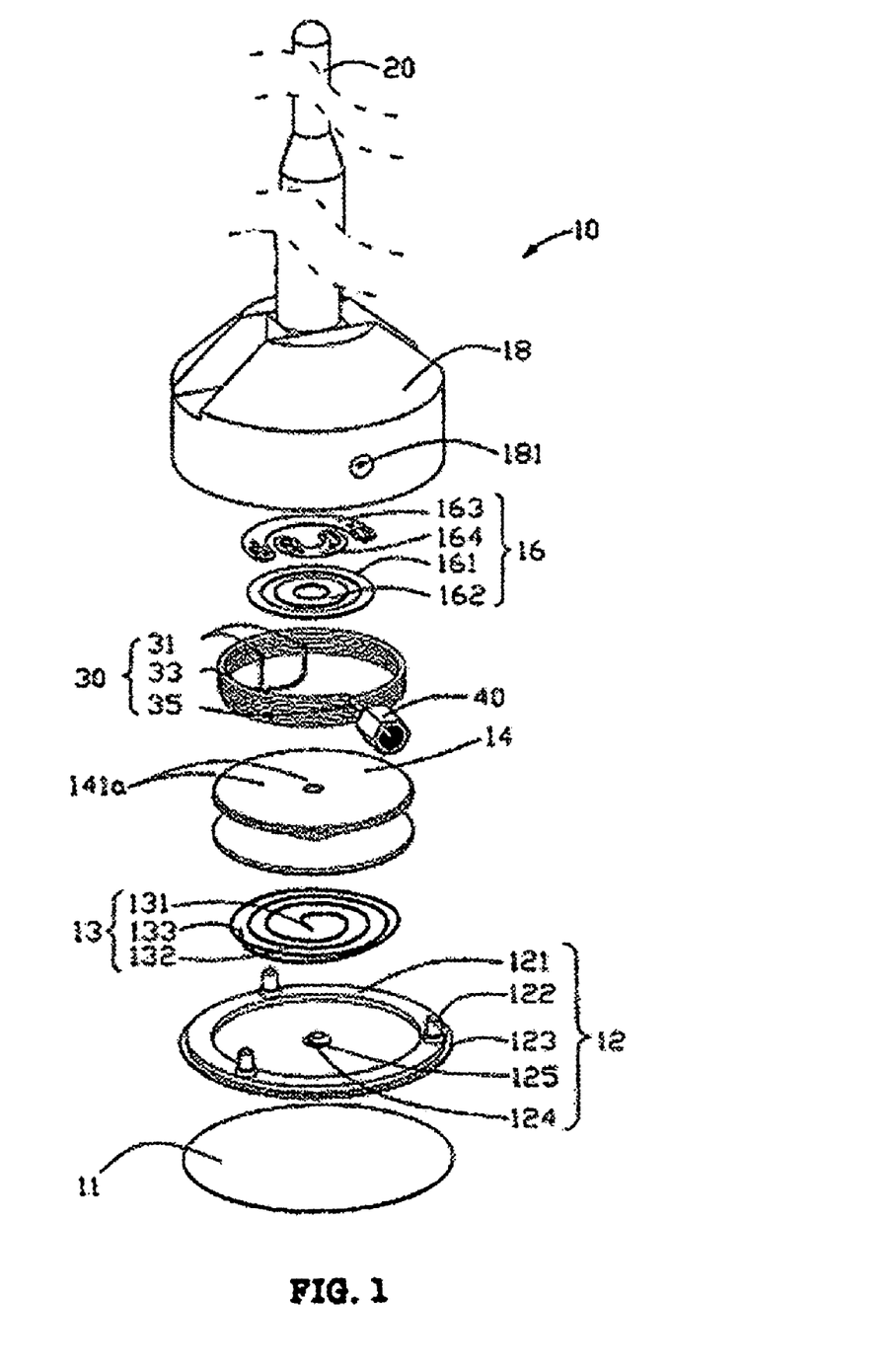
FIG. 1 is a perspective exploded view of a retractable cable device in accordance with an exemplary embodiment of the invention, the retractable cable device including a rotary portion, a third and fourth metal plate, a cover, and a base.

FIG. 1 is a perspective exploded view of a retractable cable device 10 in accordance with an exemplary embodiment of the invention.

The retractable cable device 10 is used for retracting a cable 30, which connects an antenna 20 to a wireless communication device (not shown) via an antenna adapter 40. In this embodiment, the retractable cable device 10 includes an anti-slip pad 11, a base 12, a spring 13, a rotary portion 14, a metal plate 16, and a cover 18.

In this embodiment, the anti-slip pad 11 and the base 12 are integrated to support the retractable cable device 10 and prevent the retractable cable device 10 from sliding. The spring 13 includes a first fixed end 131, a spring body 132, and a second fixed end 133 bending upwards. The metal plate 16 includes a first metal plate 161, a second metal plate 162, a third metal plate 163, and a fourth metal plate 164. The antenna 20 is arranged on the cover 18, and is electrically connected to the cable antenna adapter 40 via the cable 30. The cable 30 includes two contact ends 31, a spring body 33, and a cable pulling end 35.

In this embodiment, the base 12 includes a first ring 121, three connecting rods 122, a bottom plate 123, a columnar protrusion 124, and a positioning groove 125. The first ring 121 depends from the edge of the bottom plate 123. The connecting rods 122 are defined on the first ring 121, and are generally centrosymmetric about a central axis of the first ring 121. The columnar protrusion 124 is generally disposed at the center of the base 12, and depends from the center of the bottom plate 123. The positioning groove 125 is defined on the columnar protrusion 124. It should be noted that the number of the connecting rods 122 is not limited to three, and other amounts of the connecting rods 122 is also possible in other embodiments.

Figure 2:
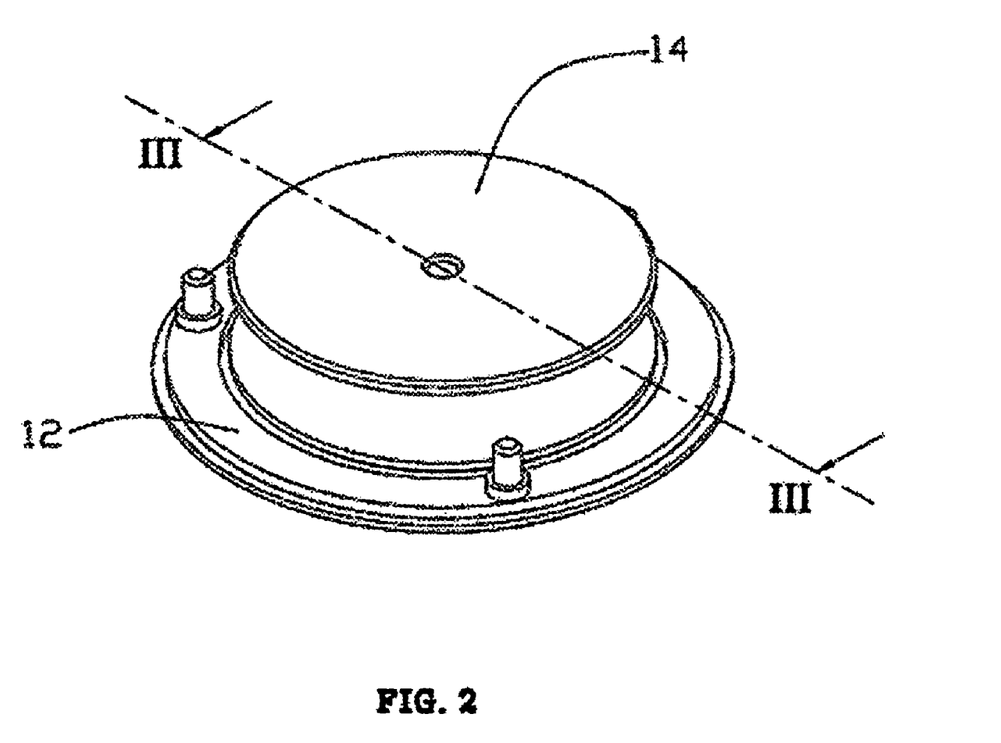
FIG. 2 is an assembled view of the rotary portion and the base of FIG. 1.
Figure 3:
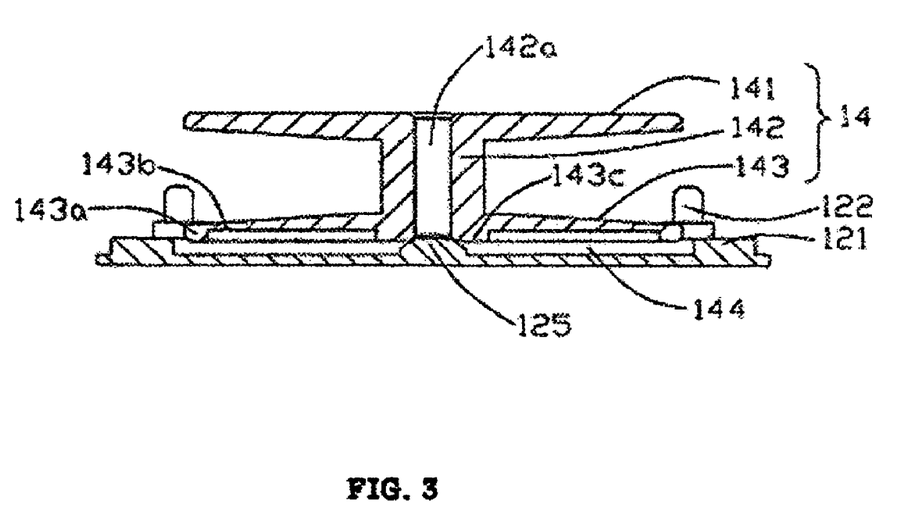
FIG. 3 is an enlarged cross-sectional view of the rotary portion and the base taken along the line III-III shown in FIG. 2.

Now referring to FIGS. 2 and 3, FIG. 2 is an assembled view of the rotary portion 14 and the base 12 of FIG. 1, and FIG. 3 is an enlarged sectional view of the rotary portion 14 and the base 12 taken along the line III-III shown in FIG. 2.

In this embodiment, the rotary portion 14 includes a first rotary plate 141, a rotary axis 142, and a second rotary plate 143. The first rotary plate 141 includes two contact through holes 141a. An axis hole 142a is defined at the center of the rotary axis 142. The axis hole 142a is disposed at the center of the second rotary plate 143. The second rotary plate 143 includes a second ring 143a, a positioning hole 143b adjacent to the second ring 143a, and a first sleeve 143c. The second ring 143a depends from the edge of the second rotary plate 143, the positioning hole 143b is generally disposed adjacent to the edge of the second rotary plate 143. and the first sleeve 143c depends from the center of the second rotary plate 143. An inner diameter of the first sleeve 143c is the same as a diameter of the axis hole 142a and the columnar protrusion 124. The second rotary plate 143 cooperates with the base 12 to form a cavity 144. The spring 13 is disposed in the cavity 144.

In this embodiment, the first fixed end 131 is fixed in the positioning groove 125, and the second fixed end 132 is fixed in the positioning hole 143b, thereby the spring 13 is fixed by the positioning groove 125 and the positioning hole 143b. The cable 30 wraps around the rotary axis 142, and is secured by the first rotary plate 141 and the second rotary plate 143. The spring 13 may also be fixed in other ways. In another embodiment, the positioning groove 125 may be a positioning hole, and the first fixed end 131 bends downwards to assist the positioning hole in fixing the spring 13.

In this embodiment, each of the contact ends 31 passes through the one of the contact holes 141a, and then sequentially contacts with one of the first metal plate 161 and the second metal plate 162. The cable pulling end 35 is connected to the wireless communication device via the antenna adapter 40. When the cable pulling end 35 is pulled out, the cable pulling end 35 urges the rotary portion 14 to rotate, and the spring 13 is forced to deform elastically. After the external force is withdrawn, the spring 13 rebounds and drives the rotary portion 14 to rotate in an opposite direction, and the cable is retracted. When the rotary portion 14 is integrated with the base 12, the first sleeve 143c is rotatably received in the positioning groove 125 for coupling the rotary portion 14 to the base 12. In this embodiment, the outer diameter of the second ring 143b is approximately equal to the inner-diameter of the first ring 121.

Figure 4:
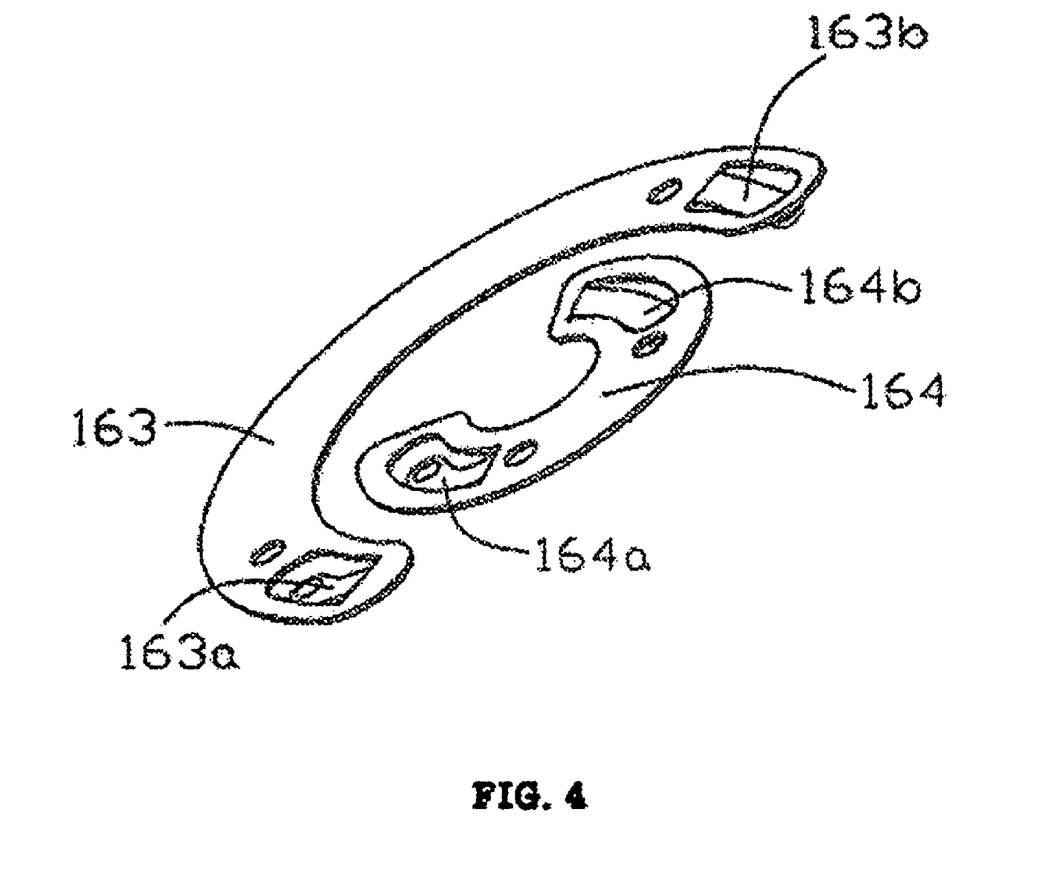
FIG. 4 is a perspective view of the third and fourth metal plate of FIG. 1.

FIG. 4 is a perspective view of the third metal plate 163 and the fourth metal plate 164 of FIG. 1. In this embodiment, the third metal plate 163 and the fourth metal plate 164 are in the same plane, and are both arc-shaped. The diameter of the third metal plate 163 is approximately equal to that of the first metal plate 161, and the diameter of the fourth metal plate 164 is approximately equal to that of the second metal plate 162. The third metal plate 163 includes a first spring finger 163a and a second spring finger 163b, and electrically contacts with the first metal plate 161 via the first spring finger 163a and the second spring finger 163b. The fourth metal plate 164 includes a third spring finger 164a and a fourth spring finger 164b, and electrically contacts with the second metal plate 162 via the third spring finger 164a and the fourth spring finger 164b. In this embodiment, the third metal plate 163 and the fourth metal plate 164 are used for maintaining the electrical connection between the cable 30 and the antenna 20 when the rotary portion 14 rotates. It should be noted that the shape of the third metal plate 163 and the fourth metal plate 164 is not limited to the arc, in other embodiments, a shape such as a circle may also be used.

Figure 5:
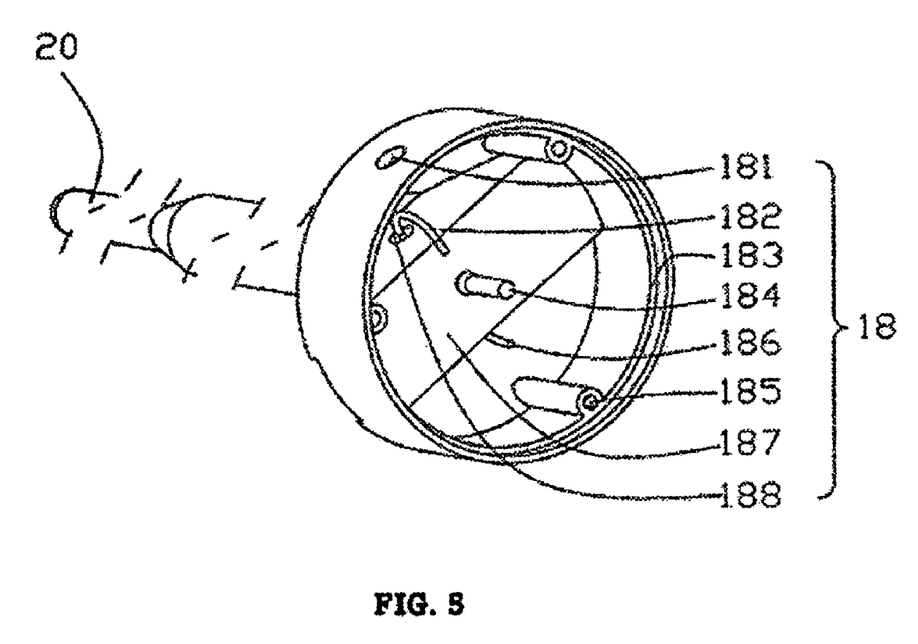
FIG. 5 is an inverted perspective view of the cover of FIG. 1.

FIG. 5 is an inverted perspective view of the cover 18 of FIG. 1. In this embodiment, the cover 18 is columnar. A cable pulling hole 181 is defined on the surface of the cover 18, and a step 183 is defined at the top of an inner wall of the cover 18. A beam 187 and three second sleeves 185 perpendicular to the beam 187 depend from the bottom of the cover 18. The three second sleeves 185 firmly abut against the inner wall of the cover 18, and respectively correspond to the connecting rods 122. The second sleeves 185 are spaced apart equally in a centrosymmetrical configuration about a central axis of the cover 18. The height of the second sleeves 185 is the same as that of the step 183. The beam 187 defines a through hole 188 therein extending from one side of the beam 187 to another opposite side thereof, and the length of the beam 187 is equal to the inner diameter of the cover 18. A fixed axis 184, the length of which is equal to the depth of the axis hole 142a, depends from the bottom of the beam 187. A first antenna contact end 182 extends out from within one end of the through hole 188, and a second antenna contact end 186 extends out from within the opposite end of the through hole 188. Not shown in the figures is that the other ends of the two contact ends 182, 186 terminate within the beam 187 in contact with the base of the antenna 20. It should be noted that the number of the second sleeves 185 is not limited to three, in other embodiments, a number of the second sleeves 185 varies to be equal to that of the connecting rods 122, and the connecting rod 122 is received in the second sleeve 185 in a clearance fit. The step 183 is interferentially fit with the first ring 121, the distance between the step 183 and the cover's end surface at the top thereof is equal to the height of the first ring 121, and the diameter of the step 183 is equal to the outer diameter of the first ring 121 The fixed axis 184 passes through the axis hole 142a, and abuts against the columnar protrusion 124. The rotary portion 14 is positioned by the fixed axis 184, and rotates about the axis 184. The cable pulling end 35 is pulled out via the cable pulling hole 181. The first antenna contact end 182 and the second antenna contact end 186 respectively contact with the fourth metal plate 164 and the third metal plate 163, for transmitting signals between the antenna 20 and the wireless communication device.

Figure 6:
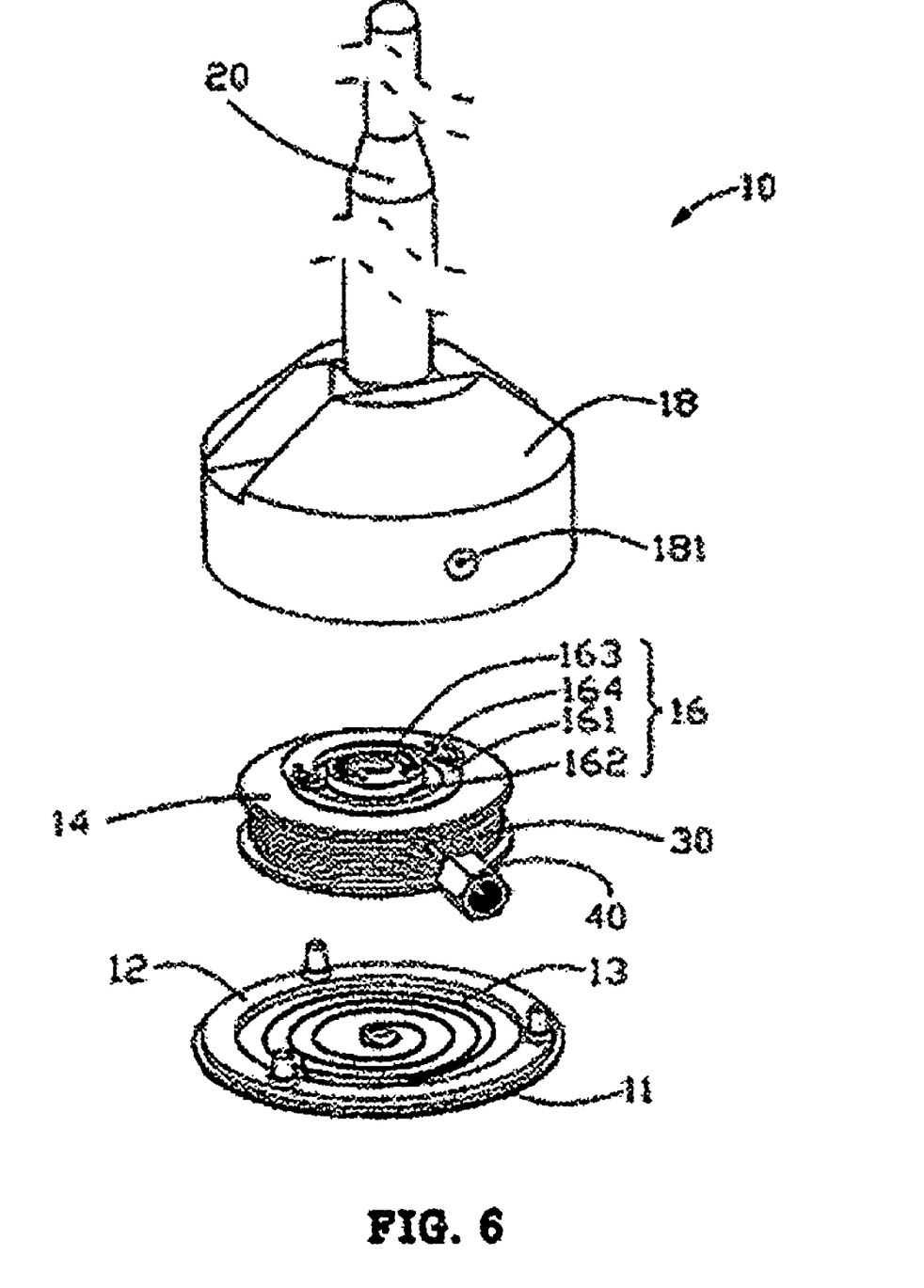
FIG. 6 is a partially assembled view of the retractable cable device of FIG. 1.
Figure 7:
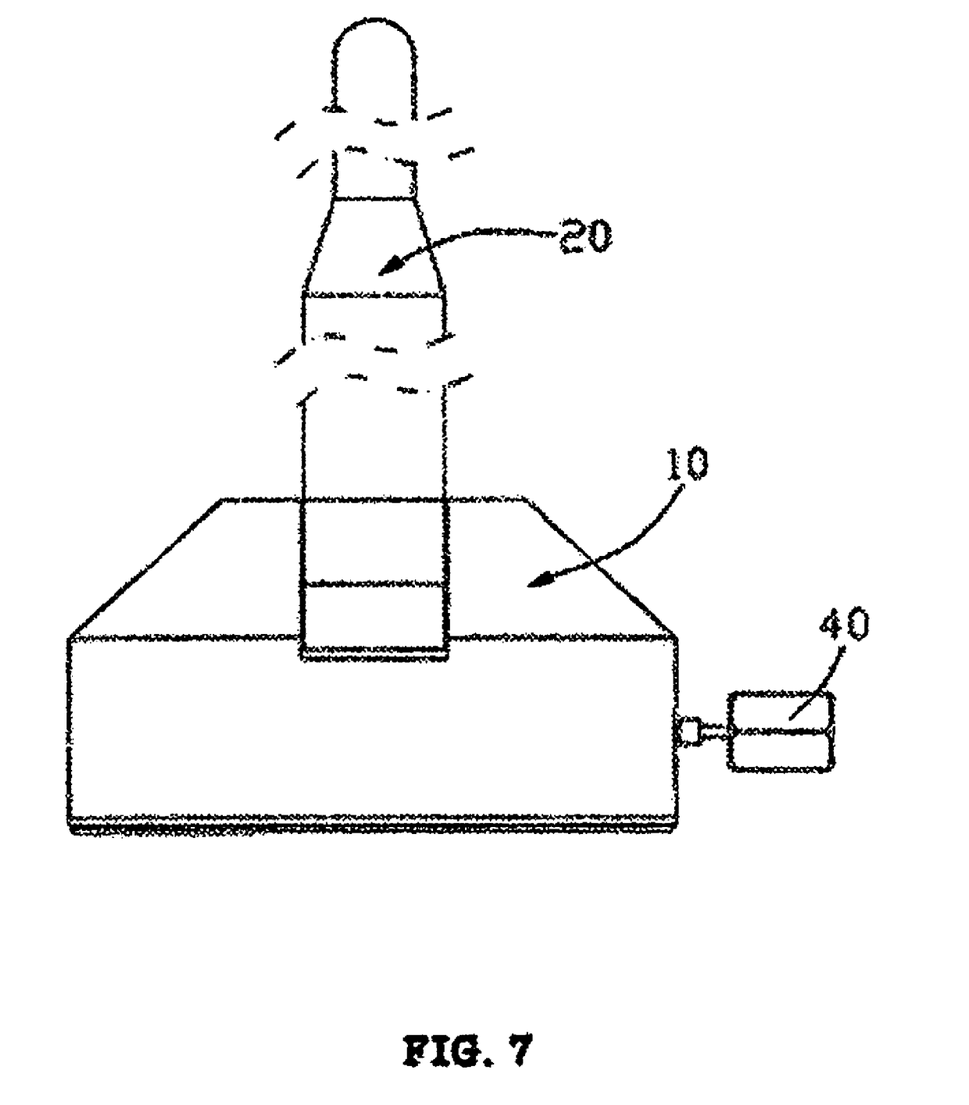
FIG. 7 is an assembled view of the retractable cable device of FIG. 1.

FIG. 6 is a partially assembled view of the retractable cable device 10 of FIG. 1. In the assembly process, the spring 13 is disposed at the bottom of the base 12, with the contact ends 31 respectively passing through the contact through holes 141a. The cable 30 wraps around the rotary axis 142. The cable pulling end 35 passes through the cable pulling hole 181 and is connected to the wireless communication device via the antenna contact end 40. The first metal plate 161 and the second metal plate 162 are then fixed on the first rotary plate 141. The third metal plate 163 is fixed on the cover 18, and electrically contacts with the first metal plate 161. The fourth metal plate 164 is also fixed on the cover 18, and electrically connects with the second metal plate 162. The fixed axis 184 is inserted into the axis hole 142a, and the connecting rods 122 are inserted into the corresponding second sleeves 185, in order to integrate the base 12 with the cover 18. The final assembled view of the retractable cable device 10 is shown in FIG. 7.

What is claimed is:

1. A retractable cable device for retracting a cable connected to an antenna, the retractable cable device comprising:
    a base;
    a rotary portion cooperating with the base to form a cavity, the cable disposed on the rotary portion;
    a spring disposed in the cavity for driving the rotary portion to rotate;
    a cover coupled to the base, comprising a beam depending from the bottom thereof, and defining a through hole extending from one side of the beam to another opposite side thereof; and
    a metal plate connected to the rotary portion, for maintaining an electrical connection between the antenna and the cable when the rotary portion rotates;
    wherein the the cover further comprises a first antenna contact end extending from and within one end of the through hole, and a second antenna contact end extending from and within the opposite end of the through hole.

2. The retractable cable device as claimed in claim 1, wherein the rotary portion is coupled to the base.

3. The retractable cable device as claimed in claim 1, further comprising a first ring.

4. The retractable cable device as claimed in claim 3, wherein the base comprises:
    at least one connecting rod defined on the first ring;
    a columnar protrusion generally defined at a center thereof; and
    a positioning groove defined on the columnar protrusion.

5. The retractable cable device as claimed in claim 4, wherein the rotary portion comprises a first rotary plate, a rotary axis, and a second rotary plate.

6. The retractable cable device as claimed in claim 5, wherein the rotary axis comprises an axis hole formed at a center thereof.

7. The retractable cable device as claimed in claim 5, wherein the first rotary plate comprises a contact through hole adjacent to the axis hole.

8. The retractable cable device as claimed in claim 5, wherein the second rotary plate comprises a second ring depending from an edge thereof.

9. The retractable cable device as claimed in claim 5, wherein the rotary portion further comprises a positioning hole disposed proximal the edge of the second rotary plate.

10. The retractable cable device as claimed in claim 9, wherein the spring comprises a first fixed end defined in the positioning groove, and a second fixed end defined in the positioning hole.

11. The retractable cable device as claimed in claim 5, wherein the rotary portion further comprises a first sleeve depending from a center of the second rotary plate.

12. The retractable cable device as claimed in claim 5, wherein the metal plate comprises a first metal plate and a second metal plate, and the first metal plate and the second metal plate are fixed on the first rotary plate.

13. The retractable cable device as claimed in claim 12, wherein the metal plate further comprises a third metal plate and a fourth metal plate electrically contacting with the first metal plate and the second metal plate, respectively.

14. The retractable cable device as claimed in claim 13, wherein the third metal plate and the fourth metal plate each comprises a spring finger, with the spring finger electrically contacting the first metal plate and the second metal plate respectively.

15. The retractable cable device as claimed in claim 4, wherein the cover comprises a second sleeve corresponding to the connecting rod.

16. The retractable cable device as claimed in claim 3, wherein the cover further comprises a step interferingly fit with the first ring, and the distance between the step and the cover's end surface at the top thereof is equal to the height of the first ring.

17. The retractable cable device as claimed in claim 1, wherein the cover further comprises:

a fixed axis depending from the bottom of the beam; and
a cable pulling hole for pulling the cable out from the cover.

18. A device for retracting a cable electrically connected to an antenna therein, comprising:

a base comprising a columnar protrusion formed at a ceter of said base and extending away from said base;

a rotary portion disposed next to said base and cooperating with said base to form a cavity therebetween, an axis hole having a hole diameter smaller than a columnar diameter of said columnar protrusion of said base defined at a center of said rotary portion and extending through said rotary portion, said columnar protrusion of said base abutting against one end of said axis hole to partially protrude into said one end of said axis hole and avoid entering said axis hole due to said columnar diameter thereof so that said rotary portion sits on said columnar protrusion to rotate;

a cable disposed on and around said rotary portion;

a spring disposed in said cavity and engaged with said rotary portion and said base respectively so as to drive said rotary portion to rotate about said columnar protrusion of said base and retract said cable back around said rotary portion; and a cover coupled to said base to cover said rotary portion and said cable therein, said cover comprising a fixed axis extending into and through said axis hole of said rotary portion from the other end of said axis hole to meet said columnar protrusion of said base at said one end of said axis hole.

* * * * *